Dec. 3, 1963 E. MATEA 3,113,252

MEANS FOR ENCAPSULATING TRANSISTORS

Filed Feb. 28, 1958

INVENTOR.
Edmund Matea

BY
R. E. Fowler

ATTORNEY

United States Patent Office 3,113,252

Patented Dec. 3, 1963

3,113,252
MEANS FOR ENCAPSULATING TRANSISTORS

Edmund Matea, Russiaville, Ind., assignor to General Motors Corporation, Detroit, Mich., a corporation of Delaware Filed Feb. 28, 1958, Ser. No. 718,275
9 Claims. (Cl. 317—234)

This invention relates to a method of encapsulation for electronic devices.

Transistors are conventionally hermetically sealed within an enclosure to protect them during normal use. The leads to the various electrodes are either brought through insulators in the housing or may form a part of the housing itself. As an example, in one type of transistor assembly, the base upon which the transistor is mounted is soldered to the collector electrode and forms an electrical lead for the same. The base also forms a mechanical closure member for the end of the cap which surrounds the transistor. Previously, caps were sealed to the base members by soldering or welding.

However, a transistor, both the main body, the ohmic and rectifying electrodes and soldered leads, are all affected by even moderate temperatures. To apply sufficient heat to the periphery of the cap to weld or solder it to the base, often made the transistor unfit for use, since an excess amount of heat, through inadvertence, might reach a vital spot.

It is therefore an object in making this invention to provide a method of sealing a semi-conductive body within an enclosure without the use of heat.

It is a further object in making this invention to provide a cold hermetic sealing process for fabricating a transistor.

With these and other objects in view which will become apparent as the specification proceeds, the invention will be best understood by reference to the following specification and claims and the illustration in the accompanying drawings in which:

Figure 2:
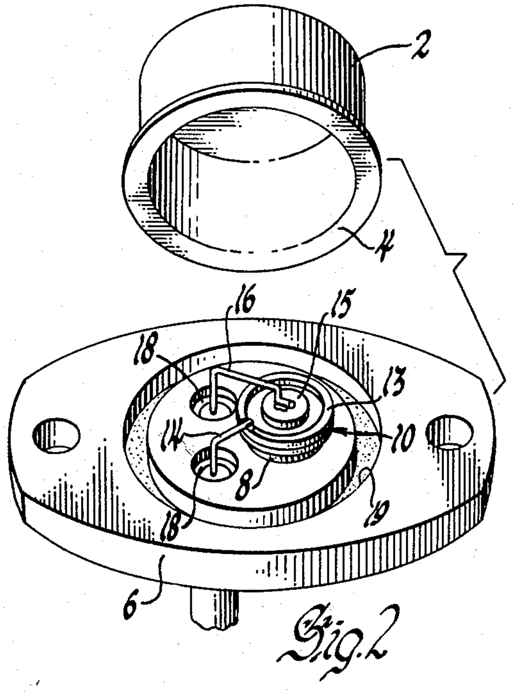
FIGURE 2 is a perspective view showing the cap and base in spaced relation.

Referring now more specifically to the drawings, the two parts of the transistor which it is desired to secure together and seal are best shown in FIGURE 2. This includes a cylindrical cap 2 having a flat flanged edge 4 at right angles to the main axis of the cap and extending out for a short distance therefrom. The base 6 of metal having good electrical and heat conducting properties has a centrally located pedestal 8 upon which the transistor body 10 is adapted to be mounted with the collector electrode 12 being soldered to the top of the pedestal 8. This, of course, mechanically connects the transistor to the mounting base. Various other electrodes 13 and 15 are connected through leads 14 and 16 respectively which extend through the mounting base and are electrically insulated therefrom by glass eyes 18.

Figure 1:
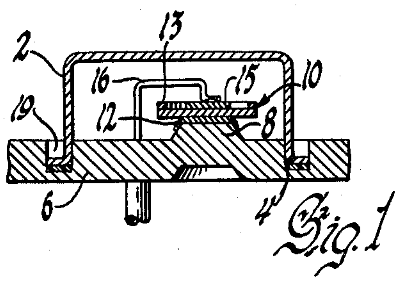
FIGURE 1 is a vertical section taken through a transistor assembly showing the cap in place on the base but no sealing step having been performed.
Figure 3:
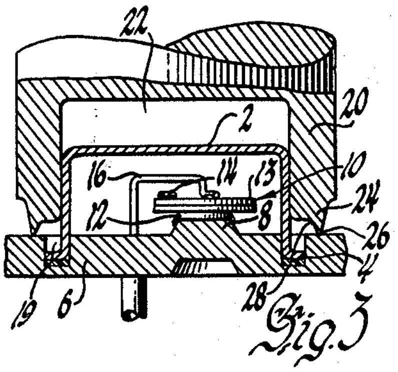
FIGURE 3 is a vertical sectional view of the transistor assembly and a partial sectional view of the forming die for crimping over a portion of the base to clamp the cap.
Figure 4:
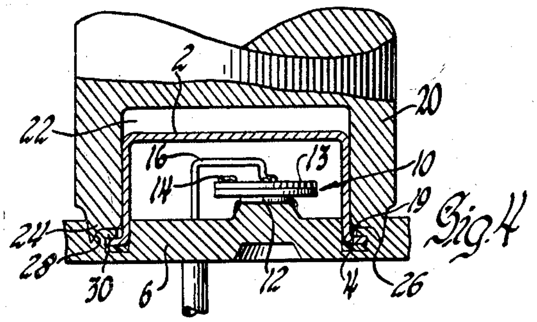
FIGURE 4 is a view similar to FIGURE 3 showing the die forced home to clamp the edge of the cap.
Figure 5:
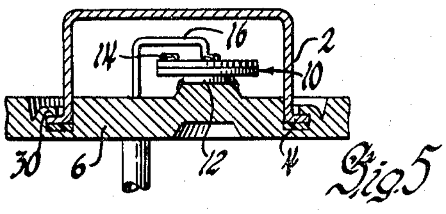
FIGURE 5 is a view similar to FIGURE 4 with the die removed.
Figure 6:
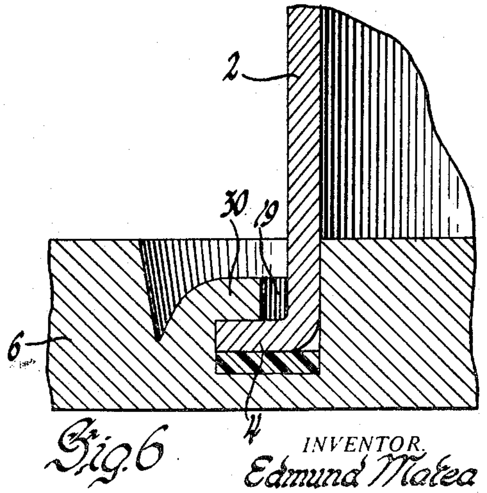
FIGURE 6 is an enlarged sectional view through the rim of the cap and base showing the clamping action of the crimped-over portion.

Around the area upon which the transistor is mounted and through which the leads pass, there is cut out an annular groove 19 having some depth. The radial dimension of the groove is approximately equal to the width of the flange 4 and is so cut that the flange of the cap may fall into the groove when placed over the transistor assembly. FIGURE 1 therefore shows the assembly in place with the cap resting on the bottom of the groove 19. A die 20 formed as shown in FIGURE 3 with a central aperture 22 fits down over the cap 2 and has an irregularly shaped annular cutting section 24. This section includes a sharpened annular ridge 26 whose diameter is slightly greater than that of the groove 19 and is provided to peel off or pare a section of the base and fold it down over the outwardly projecting edge of the flange 4. It therefore has a tapered inner surface 28 which as the die is brought down and pressed into the base, folds that portion 30 over against the flange 4. FIGURE 4 shows the assembly with the die brought home and crimping a portion of the base over the toe of the flange 4. FIGURE 5 shows the final assembly with the die 20 removed. FIGURE 6 shows in enlarged section, how this material is deformed to provide a satisfactory crimping and seal.

In order to assure that the two pieces will be so closely associated as to form a hermetic seal, with this form of assembly, there is introduced into the groove 19 prior to assembly a polymer fluorocarbon compound known commercially at "Kel–F." This fluorocarbon is mixed with a small amount of trichlorethylene. While various proportions of the two compounds may operate satisfactorily, it has been found that three grams of "Kel–F" mixed with 100 mils of trichlorethylene form a satisfactory compound. In order to introduce this compound into the bottom of the groove, the cap 2 is dipped into the solution, lifted out, and placed in a drying atmosphere for some time to dry out the trichlorethylene. It has been found that placing it in an oven at 110° C. for 10 minutes is sufficient drying. The parts are then assembled and the die applied. As an alternate method the groove 19 in the base is filled with the solution and dried in the same manner. The two parts are then assembled as shown in FIGURE 1 and mechanically sealed.

This method provides a very satisfactory encapsulation method for hermetically sealing transistor assemblies.

I claim:

1. In a casing for a transistor fabricated of a germanium wafer and an indium rectifying contact alloyed on each face thereof to form collector and emitter electrodes, a hollow flanged housing within which the transistor is sealed, a substantially flat metallic member having good heat and electrical conducting properties and an annular groove therein in which said flanged portion of said housing seats, said member having a raised plateau area on one face to the top of which one of the indium surfaces of the transistor is soldered to secure the transistor to the flat metallic member, a portion of the flat metallic member interjacent said groove and the periphery of said face being folded over the flange of the housing throughout its circumference and pressed down thereon to hermetically seal the parts together, and a coating of a sealing material interjacent said flange and a surface of said groove to assist in sealing the parts of the casing together.

2. A signal translating device which comprises a metallic base member having good heat and electrical conducting properties, a relieved area on a surface of said base member removed from the outer periphery of said surface, a signal translating device secured to a portion of said base member encompassed by said relieved area, a hollow housing member having a perimetric flange thereon seated within said relieved area, a portion of the base member interjacent said relieved area and said periphery being folded over said flange and pressed down thereon to secure the housing member to said base member, and a fluorocarbon polymer sealant interjacent said flange and said relieved area to serve in the hermetic sealing of the housing and base members together.

3. In a casing for a transistor fabricated of a germanium wafer and an indium rectifying contact alloyed on each face thereof to form collector and emitter electrodes, a hollow flanged housing within which the transistor is sealed, a substantially flat metallic member having good heat and electrical conducting properties and an annular groove therein in which said flanged portion of said housing seats, said member having a raised plateau area on one face to the top of which one of the indium surfaces of the transistor is soldered to secure the transistor to the flat metallic member, a portion of the flat metallic member interjacent said groove and the periphery of said face being folded over the flange of the housing throughout its circumference and pressed down thereon, and a sealing material interjacent said flange and a surface of said groove to serve in hermetically sealing the parts together.

4. The article as defined by claim 3 wherein the recited sealing material is a fluorocarbon polymer.

5. A signal translating device which comprises a metallic base member having good heat and electrical conducting properties, a relieved area on a surface of said base member removed from the outer periphery of said surface, a signal translating device secured to a portion of said base member encompassed by said relieved area, a hollow housing member having a perimetric flange thereon seated within said relieved area, a portion of the base member interjacent said relieved area and said periphery being folded over said flange and pressed down thereon to secure the housing member to said base member, and a sealant interjacent said flange and said relieved area to serve in the hermetic sealing of the housing and base members together.

6. A composite capsule which comprises a metallic base member, a relieved area on a surface of said base member removed from the outer periphery of said surface, a hollow housing member having a perimetric flange thereon seated within said relieved area, a portion of the base member between said relieved area and said periphery being folded over said flange and pressed down thereon to secure the housing member to said base member, and a sealant between said flange and said relieved area to serve in the hermetic sealing of the housing and the base members together.

7. The article as defined by claim 6 wherein the recited sealing material is a fluorocarbon polymer.

8. A signal translating device which comprises a metallic base member having good heat and electrical conducting properties, an annular groove on a surface of said base member removed from the outer periphery of said surface, a signal translating device secured to a portion of said base member encompassed by said annular groove, a hollow housing member having an outwardly directed perimetric flange thereon seated within said annular groove, a portion of the base member between said annular groove and said periphery being folded over the flange of the housing throughout its circumference to secure the housing member to said base member and a sealant interjacent said flange and said relieved area.

9. A signal translating device which comprises a metallic base member having good heat and electrical conducting properties, a relieved area on a surface of said base member removed from the outer periphery of said surface, mounting lugs integral with said base member extending outwardly from said relieved area, a signal translating device secured to a portion of said base member encompassed by said relieved area, a hollow housing member having a perimetric flange thereon seated within said relieved area, a portion of the base member interjacent said relieved area and said periphery being folded over said flange of the housing and pressed down thereon to secure the parts together, and a fluorocarbon polymer sealant interjacent said flange and said relieved area to serve in the hermetic sealing of the housing and base members together.

References Cited in the file of this patent

UNITED STATES PATENTS

| | | |
|---|---|---|
| 1,827,884 | Ellison | Oct. 20, 1931 |
| 2,138,404 | Haas | Nov. 29, 1938 |
| 2,183,641 | Double | Dec. 19, 1939 |
| 2,273,996 | Ross | Feb. 24, 1942 |
| 2,646,613 | Enzler | July 28, 1953 |
| 2,703,773 | Stimson | Mar. 8, 1955 |
| 2,732,357 | Sprung | Jan. 24, 1956 |
| 2,887,628 | Zierdt | May 19, 1959 |
| 2,888,736 | Sardella | June 2, 1959 |
| 2,896,136 | Hales | July 21, 1959 |
| 2,905,873 | Ollendorf et al. | Sept. 22, 1959 |
| 2,957,236 | Kreuchen | Oct. 25, 1960 |

FOREIGN PATENTS

| | | |
|---|---|---|
| 348,875 | Great Britain | May 21, 1931 |